United States Patent [19]

Uramachi

[11] Patent Number: 5,351,537
[45] Date of Patent: Oct. 4, 1994

[54] HEAT-SENSITIVE FLOW RATE SENSOR HAVING A LONGITUDINAL WIRING PATTERN FOR UNIFORM TEMPERATURE DISTRIBUTION

[75] Inventor: Hiroyuki Uramachi, Himeji, Japan

[73] Assignee: Mitsubishi Denki Kabushiki Kaisha, Tokyo, Japan

[21] Appl. No.: 110,970

[22] Filed: Aug. 24, 1993

[30] Foreign Application Priority Data

Aug. 28, 1992 [JP] Japan .................. 4-229894

[51] Int. Cl.$^5$ .............................. G01F 1/68
[52] U.S. Cl. .................. 73/204.26; 73/204.18
[58] Field of Search ............ 73/118.2, 204.18, 204.25, 73/204.26; 338/308

[56] References Cited

U.S. PATENT DOCUMENTS

| 4,345,465 | 8/1982 | Gruner et al. | 73/204.26 |
| 4,449,402 | 5/1984 | Eiermann et al. | 73/204.26 |
| 4,478,077 | 10/1984 | Bohrer et al. | 73/204.26 |
| 4,803,875 | 2/1989 | Kuhn et al. | 73/204.26 |
| 4,936,145 | 6/1990 | Hohenstatt | 73/204.26 |
| 5,038,610 | 8/1991 | Diehl et al. | 73/118.2 |
| 5,195,367 | 3/1993 | Hohenstatt et al. | 73/204.26 |
| 5,251,481 | 10/1993 | Huck et al. | 73/118.2 |

FOREIGN PATENT DOCUMENTS

| 1-08930 | 7/1986 | Japan . | |
| 0264822 | 10/1990 | Japan | 73/204.26 |

Primary Examiner—Richard E. Chilcot, Jr.
Assistant Examiner—William L. Oen
Attorney, Agent, or Firm—Sughrue, Mion, Zinn, Macpeak and Seas

[57] ABSTRACT

A heat-sensitive flow rate sensor employs a measuring resistor unit which has patterning wirings formed on a heat-sensitive resistor and presenting a principal pattern which extends in parallel with the longitudinal axis of the measuring resistor unit. Temperature distribution over the heat-sensitive resistor is made uniform so that measuring error due to change in the temperature of a measured fluid is reduced, thus enabling flow rate measurement at enhanced accuracy.

7 Claims, 6 Drawing Sheets

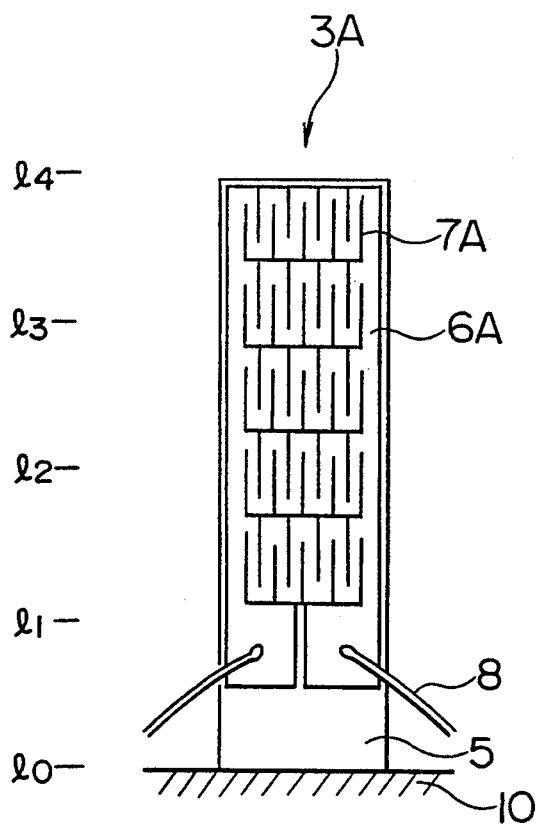
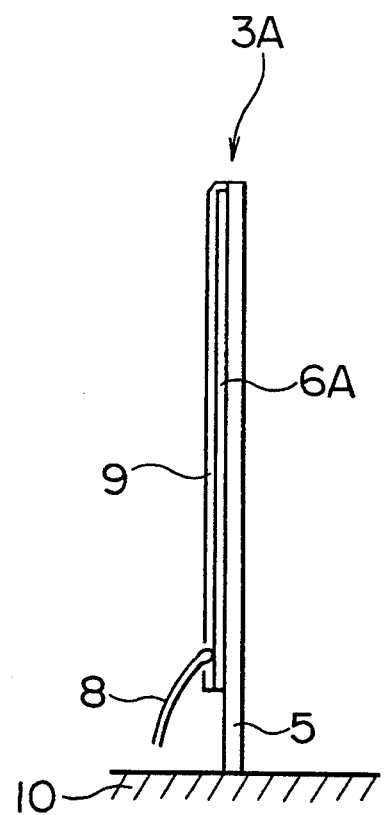
FIG. 1A
FIG. 1B

HEAT-SENSITIVE FLOW RATE SENSOR HAVING A LONGITUDINAL WIRING PATTERN FOR UNIFORM TEMPERATURE DISTRIBUTION

BACKGROUND OF THE INVENTION

1. Field of the Invention:

The present invention relates to a heat-sensitive flow rate sensor for use in measuring flow rate and flow velocity of a fluid and, more particularly, to a heat-sensitive flow rate sensor of the type which measures flow velocity and flow rate of a fluid based on the rate at which heat is carried away from a probe by the fluid which flows in contact with the probe.

2. Description of the Related Art:

FIG. 4 schematically shows the construction of a known heat-sensitive flow rate sensor of the type which is disclosed Japanese Utility Model Laid-Open No. 61-108930. A sensor tube 2, which forms a part of the fluid passage, is provided at a predetermined position in a housing 1 which defines a principal passage for the fluid. A measurement resistor unit 3 including a heat-sensitive resistor 6 (see FIGS. 5A, 5B), as well as a fluid temperature sensor 4, is disposed at predetermined location in the sensor tube 2. The measuring resistor unit 3 and the fluid temperature sensor 4, together with resistors R1 and R2, form a bridge circuit. The junctions h and c of the bridge circuit are connected to a differential amplifier 101. The output of the differential amplifier 101 is connected to the base of a transistor 102. The transistor 102 is connected at its emitter to a junction a of the bridge circuit and at its collector to a power supply 103.

FIGS. 5A and 5B are a front elevational view and a side elevational sectional view of an example of the measuring resistor unit 3 of the heat-sensitive flow rate sensor. Referring to these Figures, the measuring resistor unit 3 has a substrate 5 made of an insulating material such as alumina on which is formed a heat-sensitive resistor 6 in the form of a film. The heat-sensitive resistor 6 is made of a material which varies its resistivity according to temperature, and more specifically, to a material having a positive temperature coefficient. A patterning line wiring 7 is laid on the heat-sensitive resistor 6 so as to provide a path of electrical current. Lead lines 8 are connected to an end of the resistor 6. A protective coat 9 is formed on the heat-sensitive resistor 6 so as to protect the latter. The measuring resistor unit 3 is supported in the detecting tube 2 by a support portion 10. The operation of this known heat-sensitive flow rate sensor is as follows. When flow of a fluid at a constant flow rate exists in the housing 1, the bridge circuit is balanced in such a manner that the mean temperature of the heat-sensitive resistor 6 of the measuring resistor unit is maintained at a level which is higher than the fluid temperature by a predetermined value, by the control of the electrical current supply to the bridge circuit. The control of the electrical current supply is performed by a control circuit constituted by the differential amplifier 101 and the transistor 102. When the flow rate of the fluid is changed, rates of heat conduction to the surfaces of the heat-sensitive resistor 6 and the supporting substrate 5 changed. This change varies the temperature of the measuring resistor unit 3, causing a corresponding change in the resistivity of the measuring resistor unit 3, so that an imbalance is caused in the bridge circuit. The control circuit then operates to increase the electrical current supplied to the bridge circuit. Consequently, the heat-sensitive resistor 6 is heated so that the mean temperature of the resistor 6 is elevated to the level exhibited before the change in the fluid flow rate, whereby the bridge circuit is balanced again. The level of the electrical current supplied to the measuring resistor unit is used to measure of the flow rate of the fluid. The fluid temperature sensor 4, which is held by another supporting substrate and which is made of a resistor having temperature-dependency of resistivity, provides compensation for change in the output which otherwise is caused by a change in the fluid temperature. In the known heat-sensitive flow rate sensor having the described construction, the heat generated by the heat-sensitive resistor 6 is not only carried away by the fluid, but part of the heat is transmitted to the supporting portion of the measuring resistor unit 3, while other parts of the heat are changed into radiation energy and are dissipated as electromagnetic waves. Consequently, such a temperature distribution is developed over the measuring resistor unit 3 that the temperature is high in the region near the free end and low at the supported or base end of the measuring resistor unit 3, as shown in FIG. 6. Such a temperature difference between the free end and the base end of the measuring resistor unit 3 is further enhanced when the heat-sensitive resistor 6 is made of a material having a positive temperature coefficient of resistance, with a series type patterning wiring 7 in which the major pattern of the wiring 7 extends perpendicularly to the longitudinal axis of the measuring resistor unit 3 as shown in FIGS. 5A and 5B. This is because in such a case the resistivity of the heat-sensitive resistor is locally elevated at the high-temperature region and locally lowered at the low temperature region, with the result that the high-temperature region is further heated as compared with the low-temperature region, thus enhancing the temperature differential between the free end and the base end of the measuring resistor unit 3. Since, the mean temperature of the heat-sensitive resistor 6 is controlled to a constant level by the control circuit. Thus, a large temperature gradient is formed over the heat-sensitive resistor 6 because of locally developing a high temperature differentials. The rate of heat radiation increases in proportion to the fourth power of the absolute temperature. In general, the temperature gradient along the heat-sensitive resistor 6 is greater when the flow rate of the measured fluid is smaller, so that the temperature dependency of the heat radiation rate increases when the flow rate is small. When the rate of heat radiation increases, the proportion of the radiated heat to the total heat generated by the heat-sensitive resistor 6 increases correspondingly, so that the temperature coefficient of the heat transfer coefficient, as well as the flow-rate dependency of the temperature coefficient of the mean heat transfer coefficient, is increased. This results in error in the measurement, particularly when the temperature and flow rate of the fluid are changed. Thus, the known heat-sensitive flow rate sensor can not accurately respond to changes in the temperature and flow rate of the fluid to be measured.

SUMMARY OF THE INVENTION

Accordingly, an object of the present invention is to provide a heat-sensitive flow rate sensor in which temperature distribution over the heat-sensitive resistor 6 is made as uniform as possible so as to enhance the measuring accuracy by diminishing measurement error under varying temperatures and flow rates of the fluid, thereby overcoming the above-described problems of the prior art. To this end, according to the present invention, there is provided a heat-sensitive flow rate sensor, comprising: a housing which provides a principal path of flow of a fluid; a detecting tube disposed at a predetermined location inside the housing; a measuring resistor unit disposed in the detecting tube; a fluid temperature sensor disposed in the detecting tube; and resistors connected to the measuring resistor unit and the fluid temperature sensor so as to form a bridge circuit; wherein the measuring resistor unit includes a supporting substrate, a heat-sensitive resistor formed on the supporting substrate and patterning wirings formed on the heat-sensitive resistor such that the principal pattern formed of the patterning wirings extend in parallel with the longitudinal axis of the measuring resistor unit. According to the invention, a uniform temperature distribution is developed over the measuring resistor unit, so that the proportion of the heat dissipated by radiation to the total heat generated by the heat-sensitive resistor is reduced to decrease the temperature coefficient of the mean heat transfer coefficient, as well as the flow-rate dependency of the temperature coefficient of the mean heat transfer coefficient.

BRIEF DESCRIPTION OF THE DRAWINGS

FIGS. 1A and 1B are a plane view and a side elevational view of a first embodiment of the heat-sensitive flow rate sensor in accordance with the present invention;

DESCRIPTION OF THE PREFERRED EMBODIMENTS

First Embodiment

Figure 5A:
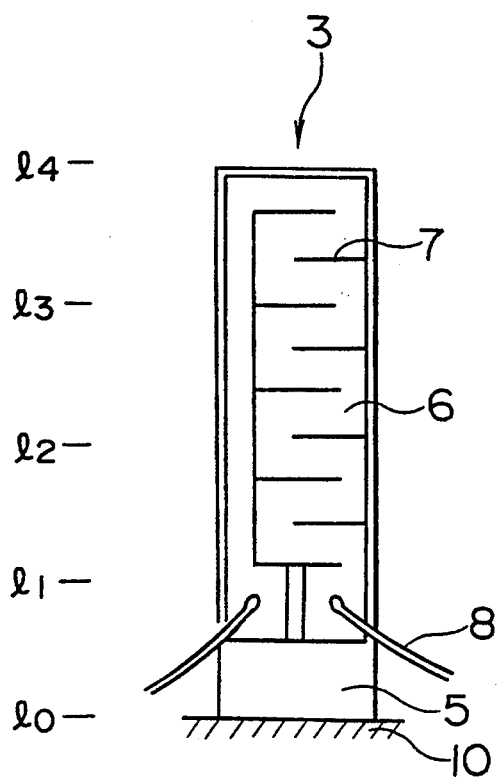
FIGS. 5A and 5B are a front elevational view and a side elevational view of the known heat-sensitive flow rate sensor.
Figure 5B:
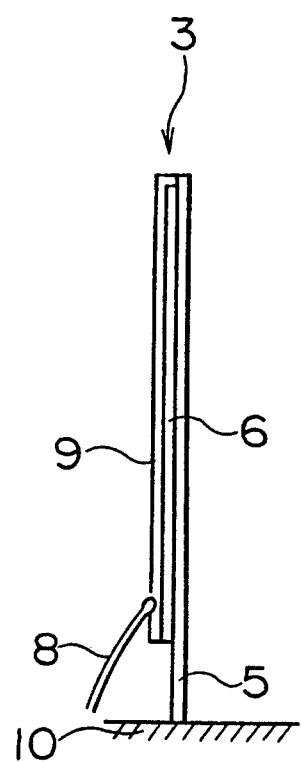

A first embodiment of the heat-sensitive flow rate sensor of the present invention will be described with reference to the drawings. The first embodiment has a supporting substrate 5, lead lines 8, a protective coat 9 and a supporting portion 10 which are substantially the same as those of the known heat-sensitive flow rate sensor shown in FIGS. 5A and 5B. A heat-sensitive resistor 6A, in the form of a thick or thin film of a conductive material such as a metal, is formed on the supporting substrate 5. Patterning wirings 7A are drawn the heat-sensitive resistor 6A so as to form a path for the electrical current. The patterning wirings 7A are laid in a parallel fashion, i.e., such that the principal pattern extends in the longitudinal direction of the measuring resistor unit 3A.

Figure 2:
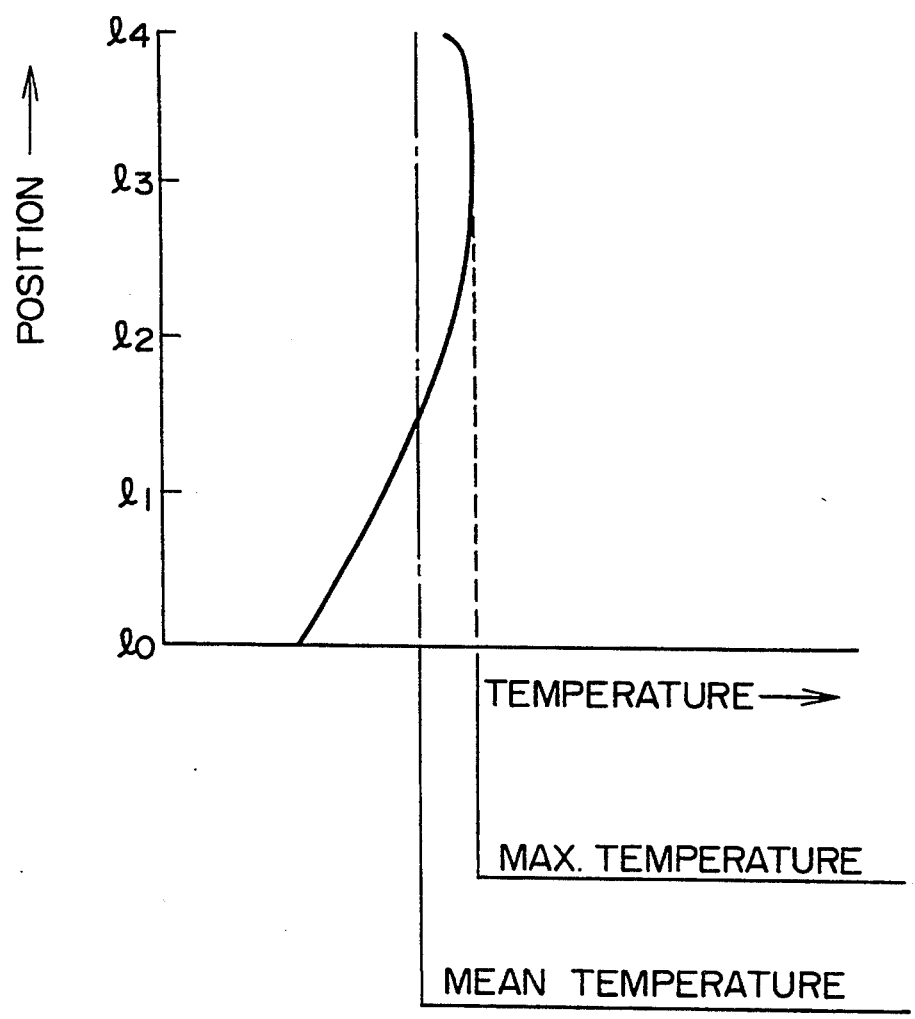
FIG. 2 is an illustration of temperature distribution over a measuring resistor unit incorporated in the first embodiment.
Figure 6:
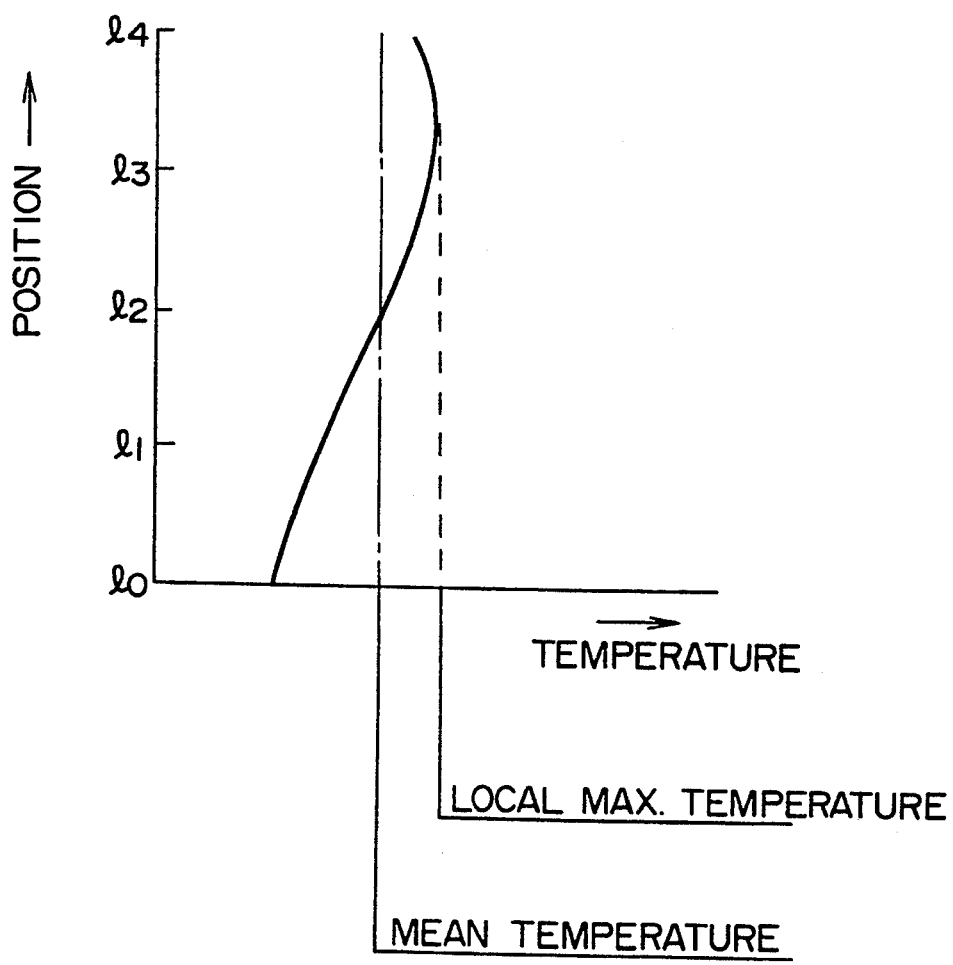
FIG. 6 is an illustration of temperature distribution over a measuring resistor unit used in the known heat-sensitive flow rate sensor.

The operation of the first embodiment is substantially the same as that of the known sensor described before. This embodiment, however, offers the following advantage due to the fact that the patterning wirings 7A of the heat-sensitive resistor 6A in the measuring resistor unit 3A are formed by a thick or thin film in such a manner that the principal pattern extends in parallel with the longitudinal axis of the measuring resistor unit 3. Namely, according to this arrangement, the rise of resistance values is suppressed local portions of the heat-sensitive resistor 6A where a high temperature would have developed in the known sensor and, at the same time, the lowering of resistance values is reduced at local portions of the same where a low temperature would have developed in the known sensor. Consequently, the temperature differential over the heat-sensitive resistor 6 is reduced. The mean temperature of the heat-sensitive resistor 6A is controlled by the control circuit. Thus, in this embodiment, the temperature distribution over the heat-sensitive resistor 6A is made uniform as compared with the known sensor. Namely, no significant difference exists between the local maximum temperature and the mean temperature of the heat-sensitive resistor 6A. Consequently, the difference between the "Maximum Temperature" and the "Mean Temperature" as shown in FIG. 2 is substantially less than the difference between the "Local Maximum Temperature" and "Mean Temperature" as shown in FIG. 6. As a result, the proportion of the heat dissipated by radiation to the total heat generated is reduced, and thus the value of the temperature coefficient of the mean heat transfer coefficient, as well as the flow-rate dependency of the temperature coefficient of the mean heat transfer coefficient is lowered. Thus, the first embodiment as described reduces the measurement error due to change in temperature and flow rate, thus improving the measuring accuracy.

Second Embodiment

Figure 3A:
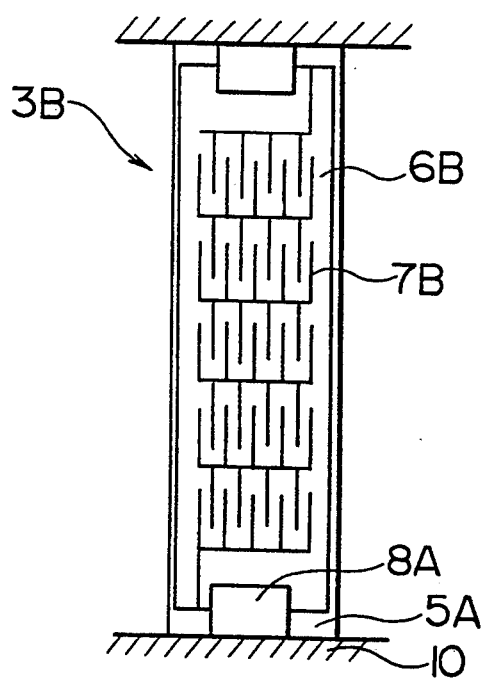
FIGS. 3A and 3B are a plane view and a side elevational of a second embodiment of the heat-sensitive flow rate sensor in accordance with the present invention.
Figure 3B:
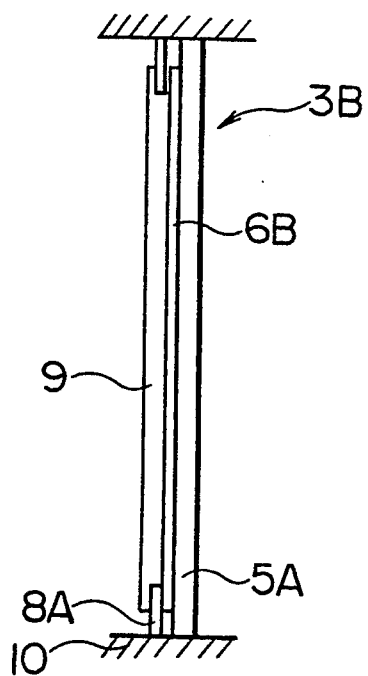
Figure 4:
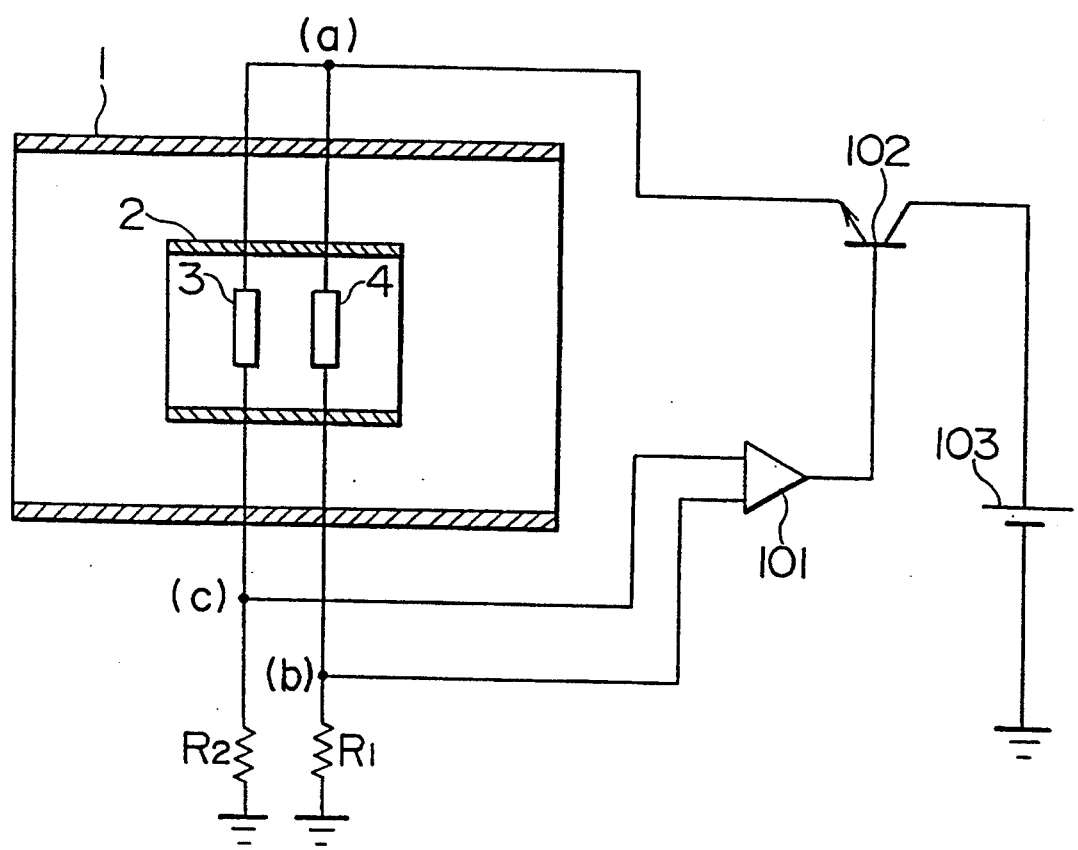
FIG. 4 is a circuit diagram of a known heat-sensitive flow rate sensor.

In the first embodiment, only one cantilevered tabular member is used as the supporting substrate 5. This, however, is only illustrative and the substrate 5 may be of the type which supports both longitudinal ends of the measuring resistor unit 3, as is shown in a second embodiment which is illustrated in FIGS. 3A and 3B. The second embodiment also has the construction in which the patterning wirings 7B of the heat-sensitive resistor 6B are laid such that the principal pattern extends in parallel with the longitudinal axis of the measuring resistor unit 3B.

Although a single measuring resistor unit 3B is used in each of the described embodiments, the invention can equally be carried out by using such a measuring resistor unit employing two or more parallel-connected resistors disposed suitable positions in the housing so that these resistors in cooperation provide a composite resistance value which is required for the measuring resistor unit.

What is claimed is:

1. A heat-sensitive flow rate sensor comprising:
   a housing which provides a principal path of flow of a fluid;
   a detecting tube disposed at a predetermined location inside said housing;
   a measuring resistor unit disposed in said detecting tube;
   a fluid temperature sensor disposed in said detecting tube; and
   resistors connected to said measuring resistor unit and said fluid temperature sensor so as to form a bridge circuit;

wherein said measuring resistor unit includes a supporting substrate, a heat-sensitive resistor formed on said supporting substrate, and a wiring pattern formed on said heat-sensitive resistor such that conducting wires of said wiring pattern principally extend in parallel with a longitudinal axis of said measuring resistor unit in such a manner that the temperature distribution over said heat-sensitive resistor is substantially uniform.

2. A heat-sensitive flow rate sensor according to claim 1 wherein said measuring resistor unit is supported only at its one longitudinal end on said detecting tube.

3. A heat-sensitive flow rate sensor according to claim 1 wherein said measuring resistor unit is supported at both of its longitudinal ends on said detecting tube.

4. A heat-sensitive flow rate sensor according to claim 1 wherein said heat-sensitive resistor is a thin film resistor.

5. A heat-sensitive flow rate sensor according to claim 1 wherein said supporting substrate has a substantially planar shape.

6. A heat-sensitive flow rate sensor according to claim 1 wherein said conducting wires of said wiring pattern comprise conducting wires which are interleaved and have substantially uniform lateral spacing between each adjacent pair of said conducting wires.

7. A heat-sensitive flow rate sensor according to claim 1 wherein
said heat-sensitive resistor is a thin film resistor;
said supporting substrate has a substantially planar shape; and
said conducting wires of said wiring pattern comprise conducting wires which are interleaved and have substantially uniform lateral spacing between each adjacent pair of said conducting wires.

* * * * *